United States Patent

McMillin et al.

[15] 3,676,690

[45] July 11, 1972

[54] REFLECTED LIGHT DOCUMENT READING HEAD

[72] Inventors: John V. McMillin; D. Larry Miller, both of Iowa City, Iowa

[73] Assignee: Westinghouse Learning Corporation

[22] Filed: Jan. 4, 1971

[21] Appl. No.: 103,416

[52] U.S. Cl. .....................250/219 D, 235/61.11 E, 250/227, 350/96 R

[51] Int. Cl. .....................G01n 21/30

[58] Field of Search .................250/219 D, 219 DC, 219 DD, 250/227, 210; 235/61.11 E; 350/96

[56] References Cited

UNITED STATES PATENTS

| | | | |
|---|---|---|---|
| 3,390,253 | 6/1968 | Miller | 250/219 DC |
| 2,916,624 | 12/1959 | Angel | 250/219 D |
| 3,585,396 | 6/1971 | Ferguson | 250/227 |
| 3,533,657 | 10/1970 | DaSilva | 250/219 DC |
| 3,581,100 | 5/1971 | Milford | 250/219 DC |

*Primary Examiner*—Walter Stolwein
*Assistant Examiner*—D. C. Nelms
*Attorney*—Haven E. Simmons and James C. Nemmers

[57] ABSTRACT

A device for converting information in the form of marks or punched holes on documents into electronic signals which are translated into a form acceptable to a computer. The device, commonly called a reading head, senses the intensity of light reflected from the document being read, the light being directed upon the document from a controlled, remote light source. The light is focused onto the document surface from the remote source through a system of lenses and optical fibers. Phototransistors on each side of the focused light sense the intensity reflected from the document. By focusing the light and mounting the phototransistors at a proper angle close to the document surface, greatly improved accuracy and results are obtained.

5 Claims, 3 Drawing Figures

INVENTORS
JOHN V. McMILLIN
D. LARRY MILLER
BY James C. Nemmers
ATTORNEY

INVENTORS
JOHN V. McMILLIN
D. LARRY MILLER
BY James C. Nemmers
ATTORNEY

REFLECTED LIGHT DOCUMENT READING HEAD

BACKGROUND OF THE INVENTION

Most everyone at some time or another during his or her life has had the experience of taking a test, answering survey questions, etc., in which the answers to multiple choice, true - false and other types of questions are recorded on an answer sheet or sheets by an appropriate mark in a designated spot on one of the sheets. Frequently, the answer sheets are separate documents. This method of recording answers to questions has been widely used because of the development of document readers which are capable of scanning the answer sheets at an extremely high rate of speed and "reading" the information recorded on the document and translating it into an electronic signal acceptable by a computer where the data is processed, then stored for later read out or print out. This same type of document reader is also extensively utilized for reading data in the form of punched holes on documents. Because of the increased use and importance of data processing systems of all types, this basic type of document reader is finding increasing use in many fields.

In these document readers, one of the most important components is the reading head which is that portion that converts the information from the documents to an electronic signal. There are two basic kinds of reading heads commonly used at the present time. There is the punched hole reading head which "reads" by means of light transmitted through the punched holes in a card as the card passes between the light source and the reading head. The other basic type of reading head is the mark sense type which can also work using light transmitted through a document, but more commonly mark sense reading heads utilize reflected light. With the latter method, the light source is placed on the same side of the document as the sensing means, the light source and sensors being located according to the appropriate geometry so that a maximum of the light intensity is utilized. A major improvement in the design of reflected light reading heads was brought about by the development of optical fibers which transmit light beams. As is well known to those skilled in the art, light entering one end of a fiber cannot escape and will travel the length of the fiber no matter what its configuration. These optical fibers are extensively used in document reading heads to transmit light from the light source to the document and in some systems, bifurcated fiber assemblies are employed to also take the reflected light from the document back to the sensing means such as phototransistors. Such a system is disclosed in U.S. Pat. application, Ser. No. 675,670, filed by John V. McMillin on Oct. 16, 1967 for "Sensor for Punches and Marks."

A reflected light reading head has a number of advantages which make it preferable over transmitted light reading heads when used to read marks on documents. First of all, a less expensive paper stock can be used for the recording of the data since light will not be transmitted through it but rather reflected from the document surface. Also, a larger number of responses can be recorded within a given area since there is no necessity to stagger the response boxes with those on the reverse side of the sheet. Further, such problems as flaws or grains or thickness variations in the document paper itself or unavoidable smudges which cause an extraneous signal perturbation are not as critical when using reflected light as they are when transmitted light is used.

However, withknown mark sense reflective light reading heads there are the problems of wasted light intensity and uncontrollable signal variations which greatly effect the accuracy and discrimination capabilities of the system. Even with the use of bifurcated optical fibers in prior art reading heads, an appreciable amount of intensity is lost as the light travels from the light source, reflects off the paper and travels back to the phototransistors. Moreover, in order to try to attain satisfactory signal stability that will permit accurate discrimination between variable density marks (i.e. light marks, dark marks, smudges, etc.) prior art readers require an extremely narrow or tight throat between the reading head and the opposing document supporting surface. The use of a tight throat to minimize document flutter in the throat area improves signal stability somewhat but results in a high incidence of document jams and misfeeds with typical field documents. To minimize these mechanical problems, most prior art readers widen the throat. The resulting signal instability and the loss in light intensity make it more difficult to discriminate between marks on the document and reduce the accuracy of the document reader. One solution proposed to date uses a large, more powerful light source, but this generates heat which must be dissipated or the phototransistors will overheat and cease to function. Thus, there is lacking in the art a reading head which is capable of utilizing to a maximum extent the intensity of the light reflected from the document, thereby allowing a reduction in the size of the light source, without losing the advantages of sensitivity, stability and discrimination in the signals produced.

SUMMARY OF THE INVENTION

By a unique combination of geometry and the use of a few additional inexpensive components, we have designed a reading head which is greatly improved over those known in the art to date. By locating the light source remote from the document and the phototransistors, and by properly focusing the light from a relatively small source, we have been able to minimize the loss of intensity of a light directed onto the document surface. Combining this with phototransistors located at the proper angle on each side of the focused light from the source, and by tying each channel-pair of phototransistors in parallel for a given strip of the document to be read, we are able to make maximum utilization of the total light energy available. Furthermore, by properly focusing the light, the total light energy which strikes the sheet and is reflected remains constant with respect to head-to-document separations in the scan throat area thus minimizing the critical distance problem between the document and the surface of the reading head. Moreover, utilizing this geometry we have been able to build into our novel reading head extreme flexibility in that the basic reading head unit with interchangeable aperture or base plates can be utilized for scanning different types of document formats and even for reading data in the form of punched holes in documents or cards.

DESCRIPTION OF THE PREFERRED EMBODIMENT

Figures 1, 2:
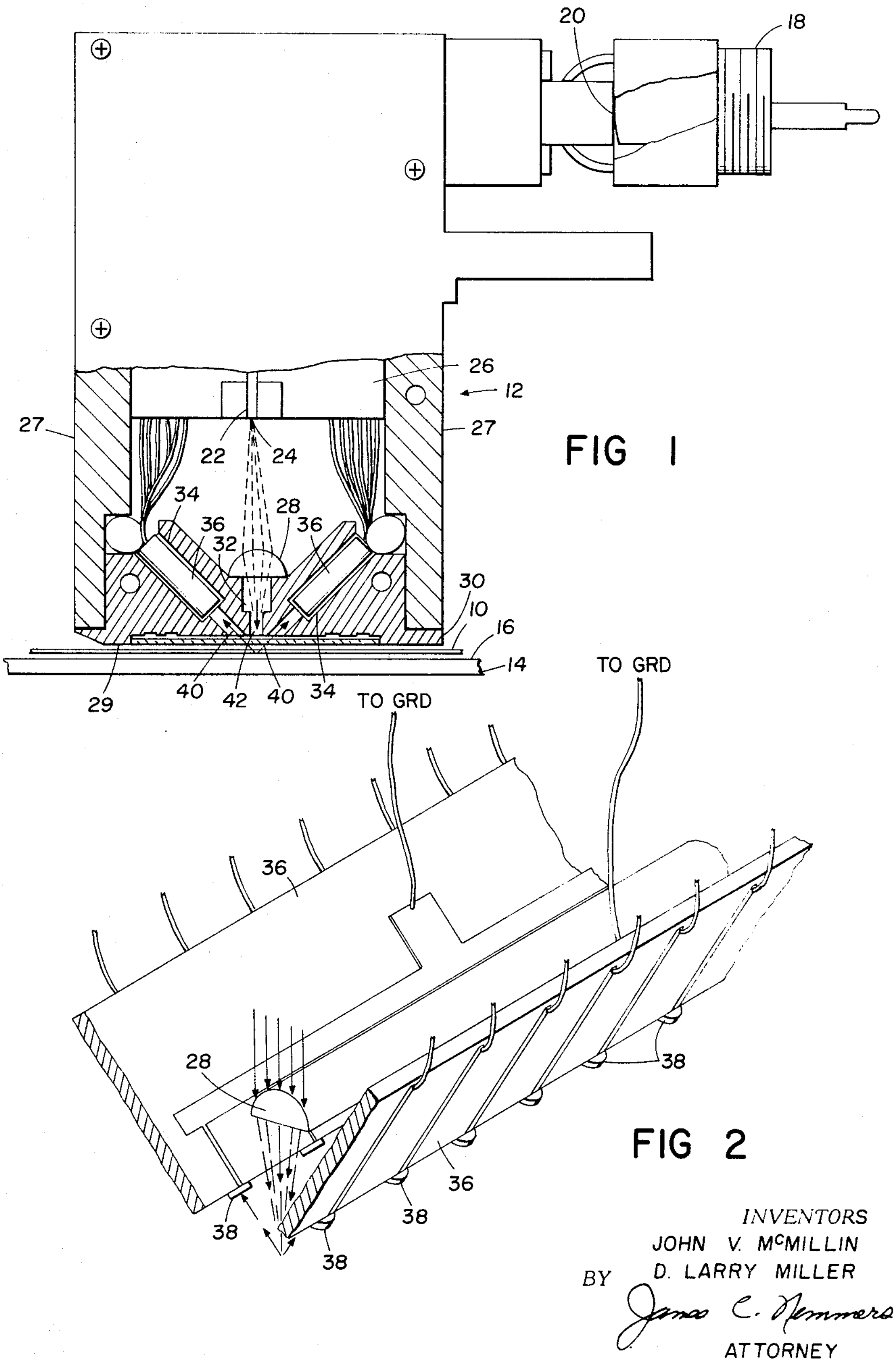
FIG. 1 is a side elevational view of a reading head partly in section.
FIG. 2 is a perspective view of a portion of the photo sensing means.

A document 10 to be read is shown in FIG. 1 as positioned between the bottom of the reading head, indicated generally by the reference numeral 12, and the document supporting table 14 which extends beneath the reading head 12 and provides a flat surface 16 parallel to the bottom of the reading head and upon which the document 10 rests as it is conveyed through the document reader. The remaining portions of the document reader by which the documents are serially conveyed beneath the reading head 12 are not shown and form no part of the invention. These other components which form a complete operative document reader are well known to those skilled in the art and their design will depend upon the particular type of document being read as well as many other factors. It should be understood at the outset, however, that the reading head which forms our invention can be used in a document reader of any type in which the data contained on the documents can be read by reflected light. As is also well known to those skilled in the art, the document 10 being read may contain a variety of response patterns which are arranged in many different ways depending upon the type of data being recorded. Most commonly, however, the data consists of a plurality of marks or responses made on the document, which responses are ideally to be marked within designated small areas such as circles, ovals, squares, etc. The response areas are located in a predetermined pattern so that the document is divided lengthwise into a series of columns and also into a plurality of rows. Each column of responses is customarily viewed by a single channel of sensors as the document passes lengthwise beneath the reading head. Since each document will contain a plurality of columns, sensors must be provided for each column or channel as will be more fully described hereinafter.

The space beneath the bottom space of the reading head 12 and the opposing parallel surface 16 is the space through which the document must pass in order to be read. This space is commonly referred to as the throat and its width can be extremely critical. Typically, a document has a thickness of four to seven thousandths of an inch. Ideally, the document surface to be read should consistently be as close to the bottom surface of the reading head 12 as possible to minimize the loss of light intensity and intensity variations. As previously noted, however, if the width of the throat is set too tight, a high incidence of jams will occur because of wrinkled or bent documents, and such tight throats commonly present many mechanical problems. On the other hand, if the throat is made sufficiently wide so as to minimize the mechanical problems, the document tends to "flutter" or ripple within the wide throat causing an unacceptable and uncontrollable variance in the amount of light intensity reflected. Since marks which form the responses to be read vary in density, it becomes extremely difficult if not impossible to discriminate between dark marks and light marks, big marks and little marks, smudges, etc. Thus, the accuracy of the document reader is adversely affected and erroneous results may be produced. In our novel reading head design, a relatively wide throat can be utilized without adversely affecting the sensitivity, stability and discrimination of the reading head thus producing accurate reliable results. This ability of our reading head to utilize a wide throat results from the design geometry which provides for the same intensity of reflected light to be received by the phototransistors regardless of whether the document is in flush contact with the bottom face of the reading head 12 or whether the document surface being read is as much as thirty-five thousandths of an inch away from the reading head face. As a part of our novel reading head design, the light source in the form of a lamp 18 is located remotely from the document surface as best seen in FIG. 1. The lamp 18 has a lens 20 that focuses the light emitted by the lamp directly onto the faces 21 of a bundle of optical fibers 22.

Figure 3:
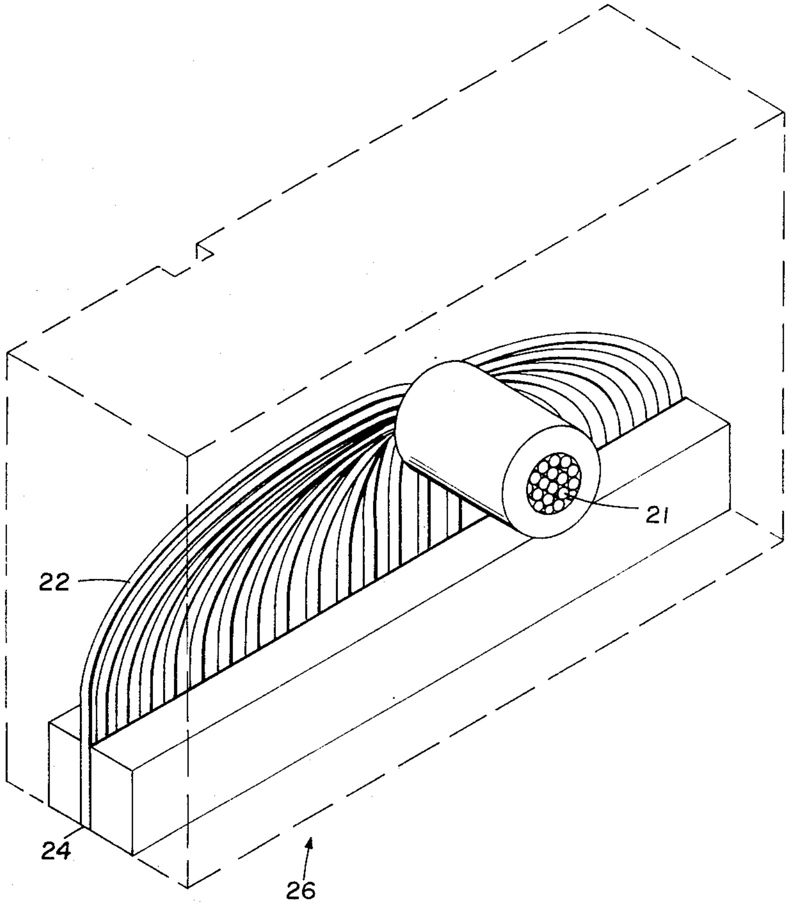
FIG. 3 is a perspective view of the portion of the reading head which produces linear illumination from a single light source.

As best seen in FIG. 3, the ends of the optical fibers 22 from which the light is emitted are arranged along a line by positioning them in a slot 24 formed in the upper part of the reading head 12. As seen in FIG. 1, the light from the ends of the fibers 22 is emitted at a considerable distance above the bottom face of the reading head 12. Preferably, the bundle of fibers 22, the lamp 18 and the supporting structure necessary therefor are combined into a unitary structure which we refer to as the linear illuminator 26. As indicated in FIG. 1, the linear illuminator 26 is mounted between the sidewalls 27 of the reading head 12. By constructing the illuminator 26 as a unit, its vertical position can be adjusted by any suitable means within the reading head 12.

With the construction of the linear illuminator 26 that has been described, a linear light beam will be produced for the purpose of illuminating only a very small strip of the document to be read, namely, that portion passing beneath the phototransistors. In other words, it is necessary and preferable to illuminate only a single row of data or responses contained on a document at any given time. The light entering the linear illuminator 26 from the lamp 18 is focused, and the amount of intensity lost within the illuminator 26 is very minimal. Directly beneath the linear illuminator 26 is an elongated lens 28 which is preferably semi-cylindrical in shape. The lens 28 receives the narrow but diverging band of light from the linear illuminator 26 and again focuses the band of light into a very narrow band at the focal distance from the lens. The focal point of this line of light, of course, depends upon the design of the lens 28 and the distance separating the lens 28 and the illuminator 26. To best serve the purposes of the invention, the focal point should fall within the throat beneath the bottom face 29 of the reading head 12. The focal point can be varied, however, by adjusting the vertical position of the linear illuminator 26 so that the focal point can be set at the optimum place for the particular type of document being read, thereby affecting user control over the threshhold setting of the most narrow mark size that is desired to be detected.

The bottom face 29 of the reading head 12 is formed by the aperture or base plate 30, the upper portion of which serves as a supporting means for the lens 28 and also serves as the supporting structure for the sensors 38. An appropriate slot 32 is provided in the base plate 30 directly beneath the lens so that the light focused by the lens 28 can be transmitted through holes 42 onto the document passing beneath the reading head 12. As best seen in FIG. 1, an angular slot 34 is also formed throughout the width of the base plate 30 on each side of slot 32 so as to receive a printed circuit card 36. As shown in FIG. 2, each printed circuit card 36 contains along its bottom edge a plurality of sensors such as phototransistors 38. There will be one phototransistor 38 on each printed circuit card 36 for each of the channels of data to be read. Each phototransistor 38 on a printed circuit card 36 is connected in parallel externally of the card to the corresponding phototransistor 38 on the other printed circuit card 36 so that a pair of phototransistors 38 will view each channel. The printed circuit cards 36 provide the necessary connections to the phototransistors 38 to transmit the signal produced by each channel-pair of phototransistors 38 into the appropriate circuitry (not shown) of the document reader itself.

The angular slots 34 do not extend through the bottom surface of the base plate 30. However, a plurality of holes are formed in the base plate 30 along the bottom of each slot 34, and each hole 40 extends from the slot through the bottom of the base plate 30. The holes are spaced corresponding to the channels of responses to be read, and there will be one phototransistor 38 positioned at the top of each hole 40. Similarly, a plurality of holes 42 are formed in base plate 30 along the bottom of slot 32 beneath the center of lens 28, there being one such hole 42 for each pair of holes 40 and thus one hole 42 for each channel of data to be read. The holes 42 in the base plate 30 break the narrow, linear band of light from the lens 28 into a plurality of spots which are each slightly smaller than the area of response to be read. Thus, for each channel, there will be a spot of light shining on the document passing beneath the reading head 12. If no response is marked on the document, more light will be reflected into the holes 40 whereas if a response is present some of the light is absorbed and less light is reflected. Thus, as the phototransistors 38 in each channel pair view a particular column of responses, they will generally receive alternating patterns of light and darkness. With our novel design, we have found that for 30 or less channels lamp 18 only need be operated at 4 watts which is sufficient to produce a satisfactory signal level from the phototransistors 38. Additional channels simply require multiple lamps 18 and corresponding illuminators 26, which as assemblies can be positioned end-to-end to extend the length of the linear beam the necessary amount to illuminate all channels. The illuminator 26 is especially designed to be "optically active" to the edge of either end. In other words, there will be no discontinuity of light intensity between abutting illuminators. Obviously, when a response appears in a particular channel, little or no light is reflected back to the pair of phototransistors 38 in that channel and their output current drops. These signals are transmitted to the logic circuitry where they are appropriately translated into signals for transmission to a computer (not shown) where the data is stored and processed for future readout.

From the above description, it will be noted that the light from the filament of lamp 18 is twice focused before it reaches the document to be read, once by the lens 20 of the lamp itself and again by lens 28. Almost none of the light is allowed to diffuse, and thus neither the distance from the lamp 18 to the document nor the distance from the bottom surface 29 of the reading head 12 to the document surface is as critical a factor as in prior art reading heads. Because of this remote location of the lamp 18 the phototransistors 38 can be located very close to the document instead of being remotely located at the other end of an optical fiber. This further minimizes the possible diffusion of light before it is received by the phototransistors 38.

The position of the linear illuminator 26 is preferably adjusted so that the focal point of the spots of light from lens 28 fall on the far side of the throat beneath the head 12. Thus, any document passing within the throat will be within the focal length of the lens 28 and the total light energy directed on the document will not vary regardless of the position of the document close to or far away from the bottom surface 29 of the reading head 12. Although a spot of light falling on a document close to the head will be larger than a spot of light falling on a document farther away, the latter being nearer the focal point, the total light energy of each spot will be the same. Since it is the total reflected light energy which affects the phototransistors 38, and because the spot of light will never exceed the area viewed by the phototransistors 38 even though the document is as close as possible to the reading head 12, the total light energy reaching the document being read will always be the same. This will remain true even as the angle of the document varies if it flutters in the throat. As the angle changes, less light may be reflected to one phototransistor 38 of a channel pair, but proportionally more light will be reflected to the other phototransistor of the pair. Thus, variation of the distance between the light source and the sheet has no effect on the signal produced by a channel-pair of phototransistors 38, and this permits the lamp 18 to be remotely located from the document surface. Because heat from the light source is no longer a problem, the phototransistors 38 can be located very close to the document surface. This, therefore, greatly increases the sensitivity of the phototransistors 38 to signal variations in the amount of light reflected due to the responses on the sheet themselves and provides accurate discrimination between various responses.

An additional advantage of the use of focused spots of light is that small-mark detection or resolution is sharpened and "anticipation" is prevented. By "anticipation" we mean the phenomenon which occurs when a phototransistor begins "-seeing" or sensing the presence of a mark before the entire mark has entered its field of vision. The chief factor affecting resolution is the relative size of the spot of light in comparison to the size of the response. With our novel design, the spot of light and the response area can be nearly the same size, a desirable relationship which was difficult to achieve with prior art reading heads. Moreover, since the band-width of the spot of light is readily adjustable, it is possible to "program" the reading head to detect a certain size mark and not another. This is accomplished by adjusting the vertical position of the illuminator 26 with respect to the lens 28 which varies the focal point slightly. This adjustable resolution feature is an important one since most document scanners are used to read a variety of types of responses, some large and some small, and with our novel reading head the scanner can be programmed for the type of document response being read.

By using two phototransistors 38 connected electrically in parallel to capture the reflected light from a single channel, the signal sent to the logic circuitry will obviously be twice the signal produced if just one phototransistor was used. However, an additional advantage of the use of two phototransistors is obtained by mounting the phototransistors at an angle of 45° from the reading head face 29 and 90° from each other. As previously indicated, our novel design permits a relatively wide throat to be used, thus greatly minimizing the mechanical problems of feeding the documents through the document reader. In prior art reading head designs, if a wide throat were used, a serious problem of intensity loss and uncontrollable variability was present because the particular area of the document being read may not be parallel to the face of the reading head. Thus, light was not reflected in the direction of the phototransistor, and document flutter was produced which at times gave inaccurate and erroneous results. However, with the use of two phototransistors for each channel with the phototransistors mounted at an angle of 45° to the reading head face 29, the document can be positioned beneath the head 12 at any angle permitted by the wide throat and the combined reflectivity and thus the combined signal from the two phototransistors will remain relatively constant. As noted earlier, as the angle of the document changes, less light may be reflected to one phototransistor in a channel-pair but more will be reflected to the other.

Although generally speaking a document scanner is designed and used for reading only either marks or punched hole responses on documents, in some situations it becomes desirable to have the capability of reading both in the same document scanner. This can be accomplished rather easily in a document scanner using our novel reading head by mounting a transmitted light head (not shown) of any suitable design opposite the reading head 12 and by adapting the logic circuitry to receive signals from both kinds of heads. The line of focused light produced by the light source of the reading head 12 will act as a source of transmitted light for the other head. Also, because each spot of light is produced by a cone of light radiating from the optical fibers 22, a continuous linear band of light is produced, which is broken up into spots by the holes 42 in the base plate 30. However, these spots of light will merge back and produce a second continuous linear band of light fifteen to twenty thousandths of an inch from the base plate which band of light can then be used to illuminate channels on punched hole cards without changing the base plate, the number and spacing of the phototransistors, etc. Thus, even though spacing of the holes 42 in the base plate 30 have been designed for a particular channel spacing in a reflected light application using only the mark sense head 12, the channel spacing in the transmitted light head need not be the same because of the "recombining" of the light into a continuous band. This is a tremendous advantage since the channel spacing for standard punched-hole documents varies from the spacing of almost every mark sense document. Also, the light source used for a punched-hole reading head must be normal to the face of the head in order for the head to work efficiently and accurately. Thus, the light source of our novel design, being normal to the document surface, works extremely well in the punched hole application whereas most prior art mark sense heads use two light sources directed at an angle to the document and a single photo sensor normal to the document. By thus using this efficient and available light source of the mark sense head, the independent transmitted light head can be positioned on the same scan axis as the mark sense head 12. This makes for a more efficient mechanical design than prior art designs where the transmitted light head must be located either upstream or downstream from the mark sense head so that a separate, normal light source can be provided for the transmitted light head.

Moreover, the design of our mark sense reading head 12 allows it to be used to detect punches or holes by reflected light without the use of an independent reading head. Because the surface 16 throughout the entire throat area is designed to reflect no light at a 45° angle, surface 16 is therefore commonly a smooth black surface and because the light source is normal to it, what little light is reflected reflects at 90° and misses the phototransistors 38. Thus, when a document containing a hole passes over surface 16, the hole appears as a "-well-made" black mark. Although the reading head 12 cannot "read" whether the signal thus produced is a mark or a hole, it usually makes no difference since it will be predetermined by the document format whether the document contains holes or marks. In those instances where it is important to read both holes and marks and discriminate between them, the combination described above using the mark sense head 12 and the transmitted light head positioned opposite it on the same scan axis should be used.

Our novel design has great flexibility with respect to the spacing of channels on different documents. Of course, the base plate 30 and the number and spacing of the phototransistors 38 determine where the channels will be located and thus the responses that will be read. The base plate 30 can be fabricated to any length desired and drilled with any number and spacing of holes. The printed circuit cards on which the phototransistors 38 are mounted can also be made any length and the phototransistors 38 can be spaced at almost any practical desired spacing. Thus, the basic design of our novel head is easily adapted for any channel spacing or head length desired. The design also facilitates easy removal of the phototransistors so that individual ones can be easily replaced if necessary. Also, the light source is easy to replace and the entire head assembly can be easily sealed from foreign particles and matter.

Having thus described our invention, it will obvious to those skilled in the art that various modifications and revisions can be made to the preferred embodiment described herein without departing from the spirit and scope of the invention. It is our intention, however, that all such revisions and modifications as are obvious to those skilled in the art will be included within the scope of the following claims:

We claim:

1. A reading head for use in a document scanner or the like having means for conveying documents each containing data response channels along a supporting surface beneath said head, said reading head comprising a source of light remote from a document passing beneath the head, focusing means for directing light from said source into a linear beam and normally onto the surface of a document passing beneath said head, said focusing means including a plurality of optical fibers for forming light from said light source into a linear beam and a lens for focusing the beam of light transmitted by said optical fibers into a narrow linear band, the light from said light source being first focused before being directed into said optical fibers, means for breaking said linear beam of light into a plurality of individual spots of light, one such spot of light for each data response channel, said light source and optical fibers being combined into a unitary illuminator with said illuminator and said lens being movable relative to each other in order that the focal length of the linear beam produced by said lens can be varied, and sensing means for sensing the intensity of light reflected from a document and producing an electronic signal proportional to the light intensity so reflected, said sensing means including sensors located on opposite sides of said linear beam, there being an opposing pair of said sensors for each data response channel of a document being read, each said pair of sensors being connected in parallel and positioned to receive the total light intensity reflected from a single data response area within a particular channel.

2. The reading head claim 1 in which said lens is fixed relative to said reading head and said illuminator is movable within said reading head to thereby vary the focal length of the linear beam.

3. The reading head of claim 1 in which said linear beam is comprised of a plurality of overlapping spots of light, each said spot of light being produced by a cone of light radiating from one of said optical fibers, and said linear beam is broken up into spots of light for each data response area in each data response channel by a member containing a plurality of spaced holes, one hole for each data response area.

4. The reading head of claim 1 in which said lens and optical fibers are positioned relatively so that the focal point of said light from said lens will be on the document supporting surface beneath the reading head.

5. A reading head for use in a document scanner or the like having means for conveying documents each containing data response channels along a supporting surface beneath said head, said reading head comprising a source of light remote from a document passing beneath the head, focusing means for directing light from said source into a linear beam and normally onto the surface of a document passing beneath said head, said focusing means including a plurality of optical fibers for forming light from said source into a linear beam and a lens for focusing the beam of light transmitted by said optical fibers into a narrow linear band, the light from said light source being first focused before being directed into said optical fibers, said lens being fixed relative to said reading head, said light source and optical fibers being combined into a unitary illuminator with said illuminator being movable relative to said lens so that the focal length of the linear beam produced by said lens can be varied, and sensing means for sensing the intensity of light reflected from a document and producing an electronic signal proportional to the light intensity so reflected, said sensing means including sensors located on opposite sides of said linear beams, there being an opposing pair of said sensors for each data response channel of a document being read, the sensors in each opposing pair being positioned so as to be directed at a 45° angle to the bottom surface of the reading head and at a 90° angle to each other, each said pair of sensors being connected in parallel and positioned to receive the total light intensity reflected from a single data response area within a particular channel.

* * * * *